JAMES R. CURRIE
FRANK J. NOLA
INVENTORS

ATTORNEYS

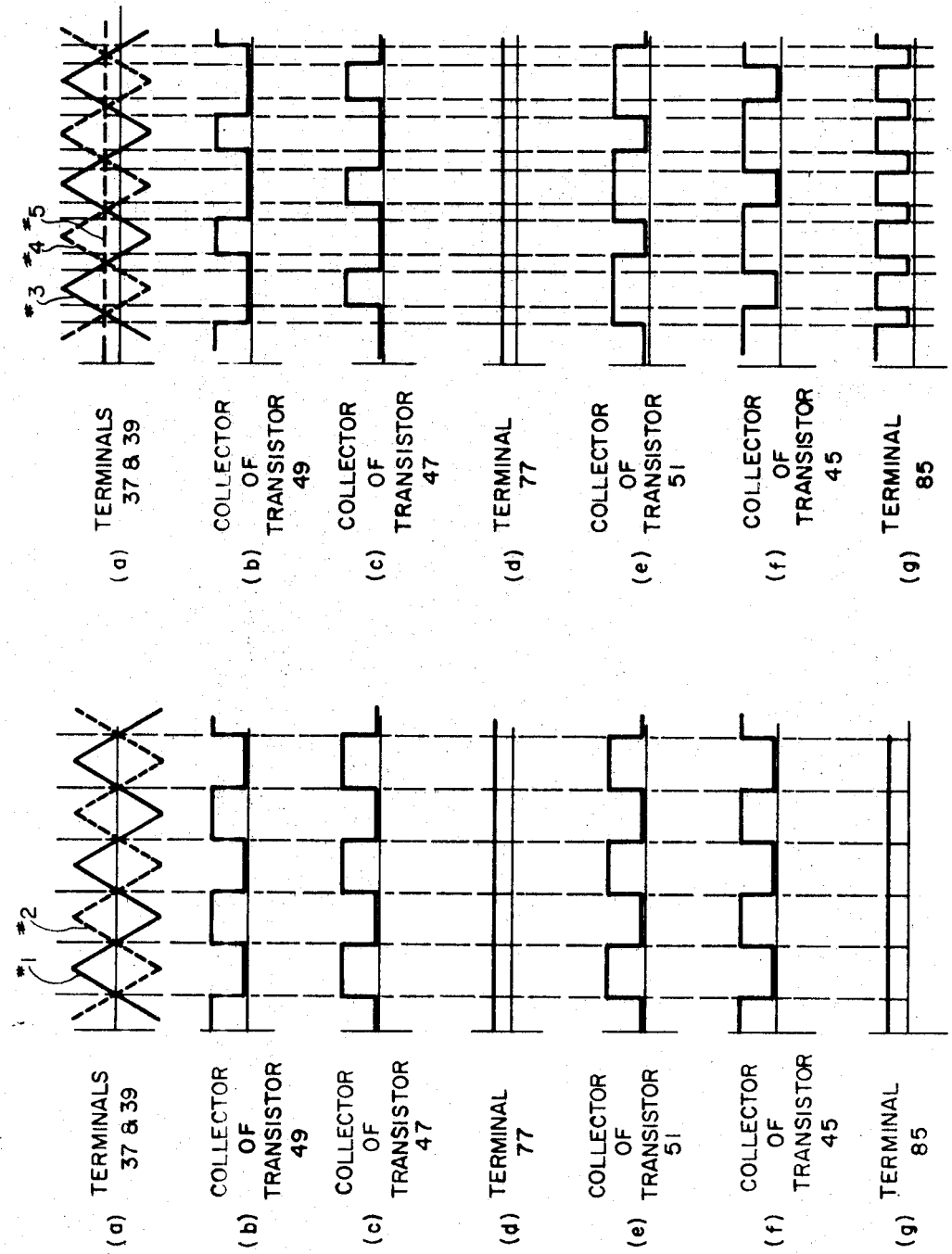

3,523,228
TRANSISTOR SERVO SYSTEM INCLUDING A
UNIQUE DIFFERENTIAL AMPLIFIER CIRCUIT
James R. Currie and Frank J. Nola, Huntsville, Ala.,
assignors to the United States of America as represented by the Administrator of the National Aeronautics and Space Administration
Filed Dec. 20, 1968, Ser. No. 785,595
Int. Cl. G05b 11/28
U.S. Cl. 318—599       4 Claims

ABSTRACT OF THE DISCLOSURE

An automatic null seeking seeking servo system including means for producing an error signal whose amplitude is proportional to the magnitude of a measured variable from a desired value. A pulse width modulator responsive to said error signal having a differential mode input and differential mode output for producing control pulses at either first and second output terminals depending on the sign of the error signal. Switch means responsive to the control pulses so as to drive a motor in a direction depending on the sign of the error signal.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to electric motor control systems and more particularly, to an electric motor control system utilizing pulse width modulation for providing an automatic null-seeking servo.

In the prior art there are many systems for controlling and regulating the direction of and magnitude of the output torque or speed of an electric motor. One such system utilizes a form of amplitude modulation wherein a DC amplifier applies a voltage to the motor proportional to the torque demanded by the system with the remainder of the supply voltage dropped across the amplifier. For use in systems which normallly operate very close to null this method results in a system of very low efficiency because of the power dissipated in the amplifier.

Because control of an electric motor by variation of the amplitude of applied voltage results in the above described waste of energy, various other attempts in the prior art have been made to vary the amount of energy applied from the power source to an electric motor. Generally such prior art attempts have involved pulse width modulation wherein the full supply voltage is applied to the motor in the form of a pulse train, of a frequency sufficiently higher than the mechanical and electrical time constant in the system. The length of time for which the voltage is applied is proportional to an input error signal. The resultant motor current is filtered by the self inductance of the motor winding and a torque is developed which is proportional to the width of the applied pulses.

In prior art servo systems utilizing pulse width modulation extremely linear sweep voltages of constant peak amplitudes and a comparator which is absolutely free from drift are required if the modulation is to be linear. These requirements in turn require a highly stabilized power supply, expensive and extremely linear components and temperature control of temperature sensitive components. Additionally, in systems which normally operate close to null, difficulties have arisen in controlling the gain of the pulse width modulator near null without introducing a deadzone into the system.

SUMMARY OF THE INVENTION

Briefly described this servo system incorporates an error generating network which energizes a pulse width modulator for converting the error signal into a pulse train for driving a servo amplifier. The output of the servo amplifier is used to energize a reversible motor for balancing the error generating network. A pulse width modulator is provided having a differential mode input and a differential mode output to obtain temperature stability and is operated as a crossover detector so as to make the system insensitive to variations of the peak amplitudes of the linear sweep voltage near null.

It is therefore an object of this invention to provide a servo system having means for accurate homing or null return.

Another object of this invention is to provide a servo system incorporating pulse width modulation.

It is a further object of this invention to provide a motor control system which is economical and efficient and which waste or dissipates a minimum amount of power.

The above and still further objects, features, and advantages of the present invention will become apparent upon consideration of the following description, taken in conjunction with the accompanying drawing in which:

FIG. 2 is a group of waveforms useful in understanding the operation of the apparatus of FIG. 1 under null condition;

FIG. 3 is a group of waveforms useful in understanding the operation of the apparatus of FIG. 1 under a positive error signal condition.

DESCRIPTION OF THE PREFERRED EMBODIMENT

Figure 1:
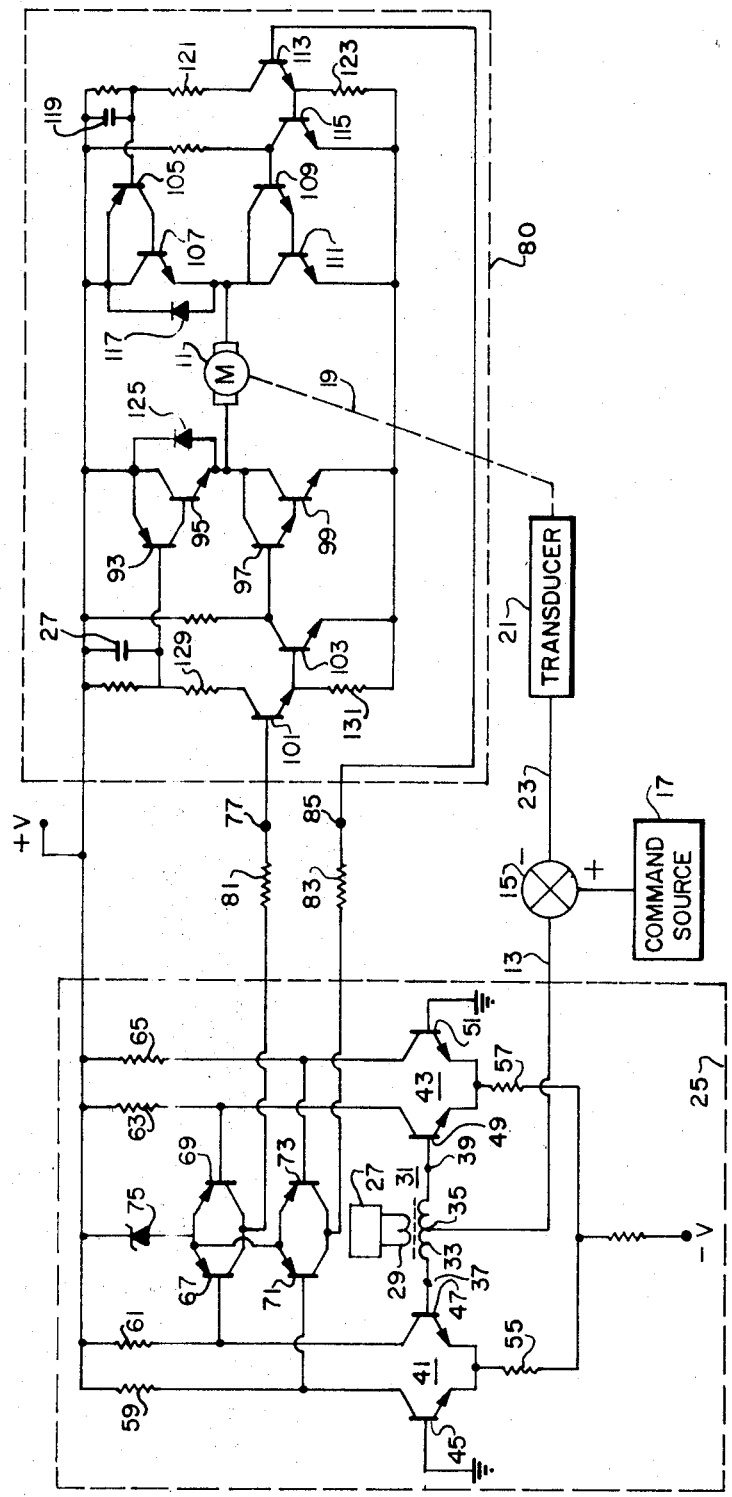
FIG. 1 is a schematic circuit diagram of a preferred servo system in accordance with this invention.

The servo system shown in FIG. 1 includes a reversible direct current servo motor 11 arranged for energization in a forward or reverse direction, depending on the polarity of an error signal on line 13 produced by summing amplifier 15. The summing amplifier has as its first input, the output of command source 17. The shaft 19 of the motor 11 is connected to a transducer 21 for converting the output of the motor into an electrical signal on line 23, which signal provides the second input to summing amplifier 15 to provide the required follow-up or nulling.

The error signal on line 13 provides the input to the pulse width modulator shown within dashed lines at 25. The pulse width modulator includes a linear time base periodic wave generator such as triangular wave generator 27 which supplies an alternating voltage of fixed amplitude and fixed frequency to the primary winding 29 of the transformer 31, whereby a triangular voltage is induced in the secondary winding 33. For mixing the triangular wave with the error signal produced by summing amplifier 15, the center tap 35 of the secondary winding is connected to line 13. In the absence of an error signal and assuming that the center tap is at ground or zero potential it will be recognized that the triangular wave voltage at terminals 37 and 39 of the secondary will have equal positive and negative excursions, being positive for precisely one-half cycle and negative for precisely one-half cycle. Also, it is recognized that the waveform at terminals 37 and 39 will be out of phase from one another by 180 degrees. A plot of the voltages at terminals 37 and 39 under such conditions is shown respectively as waveforms #1 and #2 of FIG. 2a.

If an error signal is applied to center tap 35 it will be seen to shift the mean or average level of the potential at terminals 37 and 39. If a positive voltage with respect to ground is applied to center tap 35, it will be seen that the alternating current potential at terminals 37 and 39 will be positive with respect to ground for more than one-half cycle and negative with respect to ground for less than one-half cycle. A plot of the voltages at terminals 37 and 39 under such conditions is shown respectively as waveforms #3 and #4 of FIG. 3a, wherein the positive error signal is indicated by waveform #5. It should be apparent that the existence of a negative voltage applied to center tap 35 will make terminals 37 and 39 be negative for more than one-half cycle and positive for less than one-half cycle.

The alternating voltages at terminals 37 and 39 are applied respectively to the input of conventional differential amplifiers 41 and 43 respectively consisting of transistor 45 and 47 and transistors 49 and 51. The emitters of transistors 45 and 47 are biased below ground potential by means of resistor 53 and resistor 55 connecting the emitters of transistors 45 and 47 to a source of negative voltage —V. Likewise the emitters of transistors 49 and 51 biased below ground by means of resistor 57 and resistor 53 connecting the emitters of transistors 49 and 57 to the source of negative voltage —V. The collectors of transistors 45, 47, 49 and 51 are respectively connected to a source of positive voltage +V by resistors 59, 61, 63 and 65 while the bases of transistors 45 and 51 are connected to ground. It will be recognized that with the base electrodes of transistors 45 and 51 conneted to ground, differential amplifiers 41 and 43 are operated as crossover detectors so that when the bases of transistors 47 and 49 are at ground potential the transistors 47 and 49 are at turn on threshold.

The triangular wave appearing at terminals 37 and 39 swings symmetrically about this threshold thereby switching transistors 47 and 49 on and off to generate symmetrical (with respect to time) square waves at the collectors of transistors 47 and 49. In the well known manner transistor 45 and 51 will also be switched on and off in inverse relationship to the respective condition of transistors 47 and 49 so as to generate symmetrical (with respect to time) square waves at the collectors of transistors 47 and 49. Shown in FIGS. 2b, 2c, 2e and 2f, respectively, is a plot of voltage on the collectors of 49, 47, 51 and 45 when the input error signal is zero and the center tap 35 of the secondary winding 35 is at ground potential. It will be seen that the voltages consist of positive pulses each having a duration of one-half cycle.

Shown in FIGS. 3b, 3c, 3e and 3f, respectively, is a plot of the voltages respectively appearing on the collectors of transistors 49, 47, 51 and 45 when a constant positive error voltage is applied to center tap 35. It will be recognized that a positive error signal lengthens the on time of both transistors 49 and 47 and accordingly shortens the on time of transistors 51 and 45. If the triangular potential at terminals 37 and 39 is precisely linear it should be apparent without further explanation that the increase in time duration of the positive pulses on the collectors of transistors 45 and 51 and the decrease in time duration of the positive pulses on the collectors of transistors 47 and 49 will be directly proportional to the magnitude of the positive error signal applied to center tap 35. Thus, it is seen that the function of the triangular voltage and differential amplifiers 41 and 43 is to convert the error signal into two pairs of signals, each pair consisting of inverse or push-pull time-modulated signal.

The time-modulated pulses appearing on the collectors of transistors 47 and 49 are applied respectively to the bases of transistors 67 and 69 while the time modulated pulses appearing on the collectors of transistors 45 and 51 are applied respectively to the bases of transistors 71 and 73. The emitters of transistors 67 and 69 are connected to each other and to the source of positive voltage +V via Zener diode 75 while the emitters of transistors 71 and 73 are connected to each other and to the source of positive voltage +V via Zener diode 75. The collectors of transistors 67 and 69 are "anded" together and are connected to terminal 77 via current limiting resistor 81, while the collectors of transistors 71 and 73 are "anded" together and are connected to terminal 85 via current limiting resistor 83.

The transistors 67 and 69 and the transistors 71 and 73 function as comparator circuits so as to produce at terminal 77 or 85 an output pulse on the time coincidence of positive pulses appearing on the collectors of transistors 49 and 47 or on the collectors of transistors 51 and 45. Thus, if either or both of transistors 49 or 47 is conducting at least one of transistors 67 or 69 will be biased conductive causing output terminal 77 to assume the approximate voltage appearing and the emitter of the conducting transistor.

Similarly if either or both of transistors 45 or 51 is conducting at least one of transistors 71 or 73 will be biased conductive causing output terminal 85 to assume to approximate voltage appearing on the emitter of the conducting transistor. As shown in FIGS. 2b and 2c for a zero error signal no time coincidence occurs in the nonconduction of transistors 49 and 47. Thus, the output potential applied to terminal 77 shown in FIG. 2d, remains a constant positive voltage. Similarly as shown in FIG. 2e and 2d no time coincidences occurs in the nonconduction of transistors 51 and 45 and accordingly the output potential applied to terminal 85 remains a constant, positive voltage as shown in FIG. 2g.

As previously indicated a positive error signal applied to center tap 35 transforms the waveforms of FIG. 2 to those indicated in FIG. 3. As shown in FIGS. 3b and 3c transistors 49 and 47 are never simultaneously nonconductive so either transistor 69 or 67 will be biased on at all times and the potential applied to output terminal 77 shown in FIG. 3d remains constant. Note however, as shown in FIGS. 3e and 3f, that transistors 51 and 45 are simultaneously nonconductive twice each cycle of the triangular wave thereby causing transistor 73 and 71 to become nonconductive simultaneously to thereby produce a negative going pulse at terminal 85 of twice the frequency of the triangular wave. A plot of the waveform appearing at terminal 85 under these conditions is shown in FIG. 3g.

The output terminals 77 and 85 are respectively connected to the input of a unique servo amplifier shown within the dashed lines at 80 for providing bi-directional control of motor 11 from a single polarity voltage source such as positive voltage source +V. Details of the servo-amplifier are described in copending application entitled "Transistor Power Switch," Ser. No. 785,589, filed Dec. 20, 1968.

The potential level derived at output terminal 77 is utilized to control the conduction of transistors 93 and 95 and transistors 97 and 95 by means of an emitter follower stage consisting of transistors 101 and 103. Similarly the potential level derived at output terminal 85 is utilized to control the conduction of transistors 105 and 107 and transistors 109 and 111 by means of an emitter follower stage consisting of transistors 113 and 115. As previously described with a zero error signal the potential of both output terminal 77 and 85 will be a constant positive DC voltage. This positive voltage applied to the respective bases of transistors 101 and 113 causes transistors 101 and 113 to be biased fully conductive. The conduction of transistors 101 and 103 allows base current to flow respectively to transistors 103 and 115 which thereby biases transistors 103 and 115 fully conductive. Simultaneously, current is driven into the base circuit of transistor 93 thereby rendering transistor 93 conductive and in turn biases transistor 95 conductive. Similarly, the conduction of transistor 113 allows base current to flow in transistor 105 thereby rendering transistor 105 conductive and which in turn biases transistor 107 conductive. The conduction of transistors 103 and 115 however lowers the respective bases of transistors 97 and 109 below their turn on threshold which in turn maintains transistors 99 and 111 non-conductive. Thus, with a positive voltage applied to each input terminal 77 and 85 both sides of the motor 11 are connected to the positive voltage source +V through transistors 95 and 107.

As previously described a positive error signal will cause a series of negative going pulses to be derived at output terminal 85 while the potential at output terminal 77 will remain a constant positive DC voltage. On the occurrence of the negative going pulse at terminal 85 transistors 113 and 115 will be cut off thereby cutting off the conduction of transistors 105 and 107 and in turn causing transistors 109 and 111 to become conductive. Since the potential applied to terminal 79 remains constant, transistors 93 and 95 will continue to remain conductive while transistors 97 and 99 continue to remain nonconductive. Thus a current path is provided from the voltage source +V, through transistor 95, the motor 11 and transistor 111 to ground. When the potential at terminal 85 returns to its normal positive potential transistor 113 and 115 will again become conductive causing transistors 107 and 105 to become conductive and transistors 109 and 111 to become nonconductive.

During the periods when the motor is connected across the power source, the motor winding builds up a magnetic field and upon cutoff of transistor 111 could cause a high "inductive kick" of a polarity opposite to the applied voltage to the motor, which could damage the switching transistors. Accordingly, diode 117 is connected across transistor 107 as shown, so as to provide a current path for the decaying current of the motor from the motor, to the diode, 117, the positive side of voltage source +V, transistor 95 and back to the motor 11. It is noted at this time transistor 107 and 111 are connected in series across the voltage source so that either one or the other is always conducting. To insure that both are never conducting at the same time slight delays are provided in the turn-on of each transistor. The turn-on of transistor 107 is delayed in conventional manner by the charging of a small capacitor 119 through resistor 121 while the delay in the turn-on of transistor 111 is provided by the electron storage in the base-emitter of transistor 115, which is left floating when transistor 113 is turned off. Resistor 123 controls the length of this delay.

While the foregoing discussion has been limited to cases of zero error signal or positive error signal it will be recognized that a negative error signal will cause negative going pulse to be derived at terminal 77. These negative going pulses will cause transistor 95 to become nonconductive and transistor 99 to become conductive thereby providing a current path from the positive voltage source through transistor 107, the motor 11 and transistor 99 to ground. Thus, current will flow through the motor in the opposite direction on a negative error signal than on a positive error signal. Diode 125 connected across transistor 95 as shown provides a decaying current path from the motor, to the diode 125, the positive side of the voltage source, transistor 101 and the motor 11. Additionally, delays are introduced in the turn on of transistors 95 and 99 in the same manner as previously described with relationship to the transistors 117 and 111. The turn on of transistor 95 is delayed by the charging of a small capacitor 127 through resistor 129 while the delay in the turn on of transistor 99 is provided by the electron storage in the base emitter of transistor 103, which is left floating when transistor 101 is turned off. Resistor 131 control the length of this delay.

Thus when a command signal is applied to the summing circuit 15 different from the null position indicated by the output of transducer 21 an error signal will be applied to the center tap 35 of winding 33. This will cause current to flow through the motor 11 in one direction or in the other to thereby rotate the shaft 19 in a direction varying the output of transducer 21 to a new null condition.

From the foregoing description it can be seen that the invention achieves a low offset through the use of a differential input consisting of differential amplifiers 41 and 43 thereby insuring that no output pulses will be applied to either terminal 77 or terminal 85 unless an error signal is applied to the center tap 35 of winding 33. Additionally it will be seen that through the use of differential amplifiers 41 and 43 as cross-over detectors the amplitude of the triangular wave produced by source 27 can vary without affecting the operation of the pulse width modulator 25 near null.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

What is claimed is:

1. In a motor control system the combination comprising:
    an error generating network for producing a direct voltage error signal,
    means for providing a linear time base periodic input voltage which alternates above and below a reference voltage level,
    potential combining means for combining said error signal and said alternating input voltage to provide a first and a second composite potential, said first and said second composite potentials being 180 degrees out of phase from one another,
    first means for sensing the instantaneous polarity of said first composite potential with respect to said reference level and for providing at first and second terminals, first and second switching potentials depending upon said polarity, said switching potentials comprising a pair of inversely related rectangular waveform potentials;
    second means for sensing the instantaneous polarity of said second composite potential with respect to said reference level and for providing at third and fourth terminals, first and second switching potentials depending upon said polarity, said switching potentials comprising a pair of inversely related rectangular waveform potentials;
    first "and" circuit means having an input circuit coupled to said first and third terminals for producing an output pulse during the time coincidence of said first switching potentials;
    second "and" circuit means having an input circuit coupled to said second and fourth terminals for producing an output pulse during the time coincidence of said first switching potentials;
    a power source;
    an amplifier operatively biased by said source having a first input connected to the output of said first "and" circuit and a second input connected to the output of said second "and" circuit;
    a reversible direct current motor connected in the output circuit of said amplifier, said output circuit including means for energizing said motor from said source in one direction on the occurrence of an output pulse from said first "and" circuit and for energizing said motor from said source in the opposite direction on the occurrence of an output pulse from said second "and" circuit.

2. The invention as defined in claim 1 wherein:
    said first means for sensing the instantaneous polarity of said first composite potential comprises a first differential amplifier having a first input responsive to said first composite potential and a second input responsive to said reference voltage; and said second means for sensing the instantaneous polarity of said second composite potential comprises a second differential amplifier having a first input responsive to said second composite potential and a second input responsive to said reference voltage.

3. The invention as defined in claim 1 wherein:
said error generating network includes a command source for producing a command signal indicative of a desired operating condition of said motor;
transducer means coupled to the output of said motor for producing a signal indicative of the actual operating condition of said motor; and
a summing amplifier responsive to said command signal and to said output signal of said transducer means for producing said error signal.

4. The invention of claim 1 wherein said potential combining means comprises a transformer having a primary winding connected to receive said linear time base periodic input voltage and having a center tapped secondary winding; said center tap connected to receive said error signal.

References Cited

UNITED STATES PATENTS

| | | | |
|---|---|---|---|
| 3,422,326 | 1/1969 | White et al. | 318—20.290 X |
| 3,427,520 | 2/1969 | Oppendahl | 318—20.821 X |

THOMAS E. LYNCH, Primary Examnier

U.S. Cl. X.R.

318—28, 448